(12) United States Patent
Zhang et al.

(10) Patent No.: US 8,108,519 B2
(45) Date of Patent: Jan. 31, 2012

(54) SECURE INTER-PROCESS COMMUNICATION FOR SAFER COMPUTING ENVIRONMENTS AND SYSTEMS

(75) Inventors: Xinwen Zhang, San Jose, CA (US);
Wenjuan Xu, NE Concord, NC (US);
Onur Aciicmez, San Jose, CA (US);
Jean-Pierre Seifert, Tirol (AT)

(73) Assignee: Samsung Electronics Co., Ltd., Suwon (KR)

( * ) Notice: Subject to any disclaimer, the term of this patent is extended or adjusted under 35 U.S.C. 154(b) by 186 days.

(21) Appl. No.: 12/364,303

(22) Filed: Feb. 2, 2009

(65) Prior Publication Data

US 2010/0121927 A1    May 13, 2010

Related U.S. Application Data

(60) Provisional application No. 61/112,659, filed on Nov. 7, 2008.

(51) Int. Cl.
*G06F 13/00* (2006.01)
(52) U.S. Cl. .......................... 709/225; 709/227; 719/330
(58) Field of Classification Search .................. 709/217, 709/219, 223, 224, 225, 227, 228, 229; 719/330
See application file for complete search history.

(56) References Cited

U.S. PATENT DOCUMENTS

| | | | | |
|---|---|---|---|---|
| 6,457,063 | B1 * | 9/2002 | Chintalapati et al. | 719/317 |
| 7,073,181 | B2 * | 7/2006 | Gambino | 719/328 |
| 7,529,929 | B2 * | 5/2009 | Asokan et al. | 713/161 |
| 2007/0073858 | A1 * | 3/2007 | Lakshmi Narayanan et al. | 709/223 |

OTHER PUBLICATIONS

WikiPedia—The Free Encyclopedia, "Security-Enhanced Linux," http://en.wikipedia.org/wiki/Selinux, Downloaded on May 4, 2009, 4 pages.
WikiPedia—The Free Encyclopedia, "GConf," http://en.wikipedia.org/wiki/GConf, Downloaded on Oct. 3, 2008, 4 pages.
WikiPedia—The Free Encyclopedia, "Inter-process communication," http://en.wikipedia.org/wiki/Inter-process_communication, Downloaded on Oct. 8, 2008, 4 pages.
WikiPedia—The Free Encyclopedia, "D-Bus," http://en.wikipedia.org/wiki/D-Bus, Downloaded on Oct. 3, 2008, 7 pages.

(Continued)

*Primary Examiner* — Viet Vu
(74) *Attorney, Agent, or Firm* — Beyer Law Group LLP

(57) ABSTRACT

Techniques for Inter-Process Communication (IPC) in a more secure manner are disclosed. A communication component operating outside of an operating system can obtain operating-system data pertaining to processes that also operate outside of the operating system. The operating-system data can be more reliable than information that may have been provided by the processes, thereby allowing more secure IPC and consequently a more secure computing environment and/or system. A communication component can also be operable to make control decisions regarding the IPC data (e.g., IPC messages) based on the information provided and/or originated by the operating system (or operating-system data) and/or effectively provide the operating-system data pertaining to a sender process to its intended recipient process. A recipient process can also be operable to obtain the operating-system data pertaining to a sender process. Moreover, a recipient process can make control decisions regarding the IPC data originated by the sender process based on the operating-system data effectively provided and/or originated by the operating system rather than the sender process, thereby allowing the recipient process to make control decisions based on information provided by a more reliable (e.g., Trusted) source.

40 Claims, 9 Drawing Sheets

OTHER PUBLICATIONS

WikiPedia—The Free Encyclopedia, "Java Platform, Micro Edition," http://en.wikipedia.org/wiki/Java_Platform,_Micro_Edition, Downloaded on Jul. 29, 2008, 9 pages.

Wikipedia—The Free Encyclopedia, "MIDlet," http://en.wikipedia.org/wiki/MIDlet, downloaded on Mar. 23, 2009, 2 pages.

James Carter, "Using GConf as an Example of How to Create an Userspace Object Manager," Security Enhanced Linux (SELinux) Symposium: Proceedings of the Third Annual Symposium, 2007, 29 pages.

Robert Love, "Get on the D-BUS," http://www.linuxjournal.com/article/7744, downloaded Oct. 8, 2008, 7 pages.

* cited by examiner

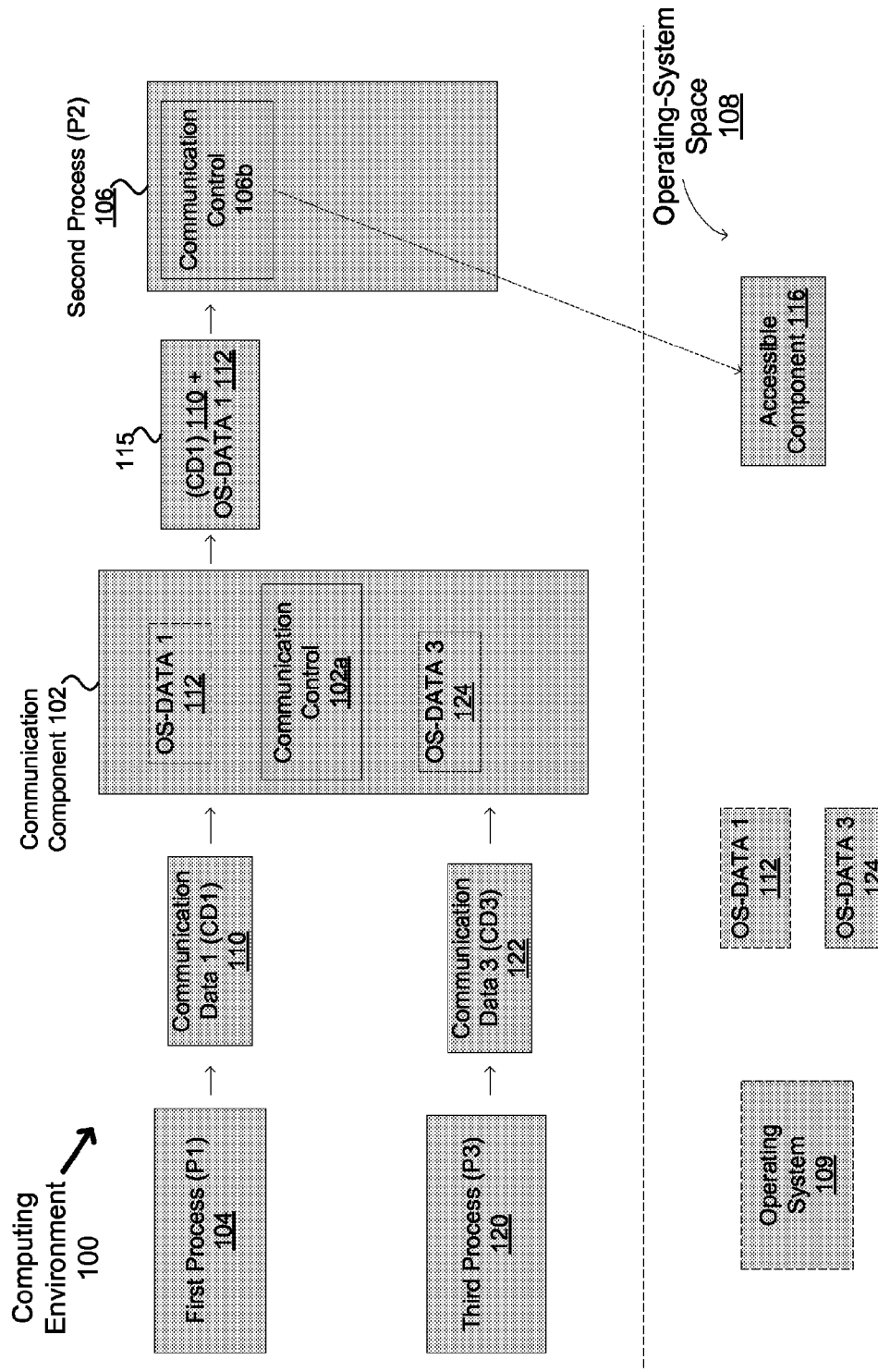

SECURE INTER-PROCESS COMMUNICATION FOR SAFER COMPUTING ENVIRONMENTS AND SYSTEMS

CROSS-RELATION TO RELATED APPLICATION

This application claims priority to provisional patent application Ser. No. 61/112,659, entitled "SECURE INTER-PROCESS COMMUNICATION FOR SAFER COMPUTING ENVIRONMENTS AND SYSTEMS", filed Nov. 7, 2008, herein incorporated by reference in its entirety.

BACKGROUND OF THE INVENTION

Conceptually, a computing system (e.g., a computing device, a personal computer, a laptop, a Smartphone, a mobile phone) can accept information (content or data) and manipulate it to obtain or determine a result based on a sequence of instructions (or a computer program) that effectively describes how to process the information. Typically, the information is stored in a computer readable medium in a binary form. More complex computing systems can store content including the computer program itself. A computer program may be invariable and/or built into, for example a computer (or computing) device as logic circuitry provided on microprocessors or computer chips. Today, general purpose computers can have both kinds of programming. A computing system can also have a support system which, among other things, manages various resources (e.g., memory, peripheral devices) and services (e.g., basic functions such as opening files) and allows the resources to be shared among multiple programs. One such support system is generally known as an Operating System (OS) which provides programmers with an interface used to access these resources and services.

Today, numerous types of computing devices are available. These computing devices widely range with respect to size, cost, amount of storage and processing power. The computing devices that are available today include: expensive and powerful servers, relatively cheaper Personal Computers (PC's) and laptops and yet less expensive microprocessors (or computer chips) provided in storage devices, automobiles, and household electronic appliances.

In recent years, more portable, mobile and handheld computing devices have been developed and generally made available to the public. By way of example, wireless phones, media players, Personal Digital Assistants (PDA's) are widely used today. Generally, a mobile or a handheld device (also known as handheld computer or simply handheld) can be a pocket-sized computing device, typically utilizing a small visual display screen for user output and a miniaturized keyboard for user input. In the case of a Personal Digital Assistant (PDA), the input and output can be combined into a touch-screen interface.

In particular, mobile communication devices (e.g., mobile phones) have become extremely popular. Some mobile communication devices (e.g., Smartphones) offer computing environments that are similar to that provided by a Personal Computer (PC). As such, a Smartphone can effectively provide a complete operating system as a standardized interface and platform for application developers.

As generally known in the art, a "process" can refer to an instance of one or more executable computer instructions (or computer program instructions) that can, for example, be executed by a computing system sequentially. A computing system may have the ability to run several computer programs and/or processes concurrently.

A "thread of execution" (or a "thread") can refer to a mechanism for splitting a program into two or more simultaneously (or effectively simultaneously) running tasks. As such, a process may effectively include one or more threads.

Inter-Process Communication (IPC) can refer to communication (or exchange of data) between multiple processes and/or threads, as generally known in the art.

The popularity of computing systems is evidenced by their ever increasing use in everyday life. Accordingly, techniques that can improve computing systems would be useful.

SUMMARY OF THE INVENTION

Broadly speaking, the invention relates to computer systems and computing environments. More particularly, the invention pertains to techniques for allowing communication between processes (or Inter-Process Communication) in computing environments and/or computing systems. It will be appreciated that the techniques, among other things, can provide more secure computing environments and/or computing systems by allowing Inter-Process Communication (IPC) to be controlled in a more secure manner.

In accordance with one aspect of the invention, a communication component operating outside of an operating system can obtain operating-system data pertaining to a first process operating in a computing environment and/or system. It will be appreciated that the operating-system data can include information that can be effectively used to make a control decision in the computing environment and/or system (e.g., an access control decision to determine whether to allow the first process to access a protected resource, such as, for example, a file). Moreover, the operating-system data can include information that is more reliable than the information provided by less reliable sources including the first process, thereby allowing better control and consequently a more secure computing environment and/or system. By way of example, the operating-system data can include security information that can be used to make a control decision (e.g., security context of the first process, one or more security policies, rules and/or conditions) and/or information that can be used to obtain the information needed to make a security decision (e.g., a process identifier that can be used to obtain the security context of the process).

In accordance with one embodiment of the invention, a communication component operating outside of an operating-system space can obtain communication data indicative of a communication from a first process also operating outside of the operating-system space. The communication component can also be operable to obtain, for the communication message, first operating-system data pertaining to the first process. The first operating-system data can include information that can effectively be used to make a control decision regarding the communication data originated by the first process.

Moreover, the first operating-system data can be effectively provided and/or be originated by the operating system and it can therefore be more reliable than the information that might have been provided and/or originated by less reliable sources including the first process, thereby allowing communication data to be controlled based on more reliable information. By way of example, the first operating-system data can include a process identifier for the first process. The communication component can, for example, obtain the process identifier from the operating system. In some situations, the process identifier may already be known and/or already available, for example, based on a connection (or virtual connection) between the first process and the communication component such connection s can be made and/or maintained by the operating system (e.g., a socket connection that is originated and/or maintained by the operating system).

In accordance with a related aspect of the invention, a communication component can be operable to make a control decision regarding the communication data based on the information provided and/or originated by the operating system. By way of example, the communication component can be operable to effectively disregard the communication data by not forwarding it to an intended recipient, namely, a second process also operating outside of the operating-system space. This decision can, for example, be made based on the process identifier of the sender process that has originated the communication data. However, it should be noted that the process identifier would be provided and/or originated by the operating system.

In accordance with another related aspect of the invention, a communication component can be operable to effectively provide the operating-system data pertaining to a first process to its intended recipient, namely, a second process also operating outside of the operating-system space. As noted above, the first operating-system data can include information that can effectively be used to make a control decision regarding the communication data originated by the first process. As such, the recipient (or second) process can use the first operating-system data to make a control decision regarding the communication data. Moreover, this control decision can be made based on information that is more reliable than the information that may have been provided and/or originated by less reliable sources including the first process because the first operating-system data can be effectively provided and/or originated by the operating system.

In accordance with yet another related aspect of the invention, a recipient (or second) process can be operable to obtain the operating-system data pertaining to a sender (or first) process from the communication data effectively provided to it, for example, by a communication component operating outside the operating-system space of the operating system in accordance with a related aspect as noted above. Moreover, the recipient (or second) process can make a control decision regarding the communication data originated by the sender (or first) process based on the operating-system data effectively provided and/or originated by the operating system.

In accordance with one embodiment of the invention, the recipient (or second) process can obtain a first process identifier of the sender (or first) process from the communication data (e.g., an IPC message). The first process identifier can, for example, be obtained and effectively provided by a communication component (e.g., a daemon process) to the recipient (or second) process in accordance with a related embodiment of the invention. In any case, the first process identifier can represent a process identifier provided and/or originated by the operating system. The recipient (or second) process can use the first process identifier to obtain information needed to make a control decision regarding the communication data originated by the sender (or first) process. By way of example, the recipient (or second) process can obtain a security context from the operating system based the process identifier of the sender (or first) process. In other words, the recipient (or second) process can be ensured that the identity of the first process has been provided by a reliable source, namely, the operating system, and then proceed to obtain the security context of the process from the operating system itself. In addition, the recipient (or second) process can be operable to obtain other security information including one or more security policies, rules and/or condition form the operating system and make a control decisions regarding the communication data in a similar manner as the operating system would.

Those skilled in the art will especially appreciate that a "D-Bus" daemon process can effectively modify "D-Bus" messages received from sending processes to include the process identifier of sending processes operating in user space in accordance with one embodiment of the invention. In addition, a "GConf" daemon process can be operable to receive a modified "D-Bus" message and use the process identifier provided by the modified "D-Bus" message in order to obtain the security context of the process identified by the process identifier (e.g., the sender process). The "GConf" daemon process can also be operable to obtain one or more access control policies, rules and/or conditions from the operating system. Moreover, the "GConf" daemon process can be operable to effectively provide an access control mechanism based on more reliable security information, provided by the operating system, similar to access control mechanisms provided by some operating systems (e.g., a Mandatory Access Mechanism (MAC) mechanism of a Secure Linux Operating System (or SELinux Operating System). Those skilled in the art will also appreciate that the "D-Bus" and "GConf" daemon processes (or a "GConfd") can operate in a SELinux Operating Environment, thereby allowing leveraging the security features of the SELinux Operating System, including the security features that may be developed in the future, as a "GConf" daemon process may be operable to obtain them from the SELinux kernel (or internals) in accordance with the invention. As a result, a "GConf" daemon processes can be operable to effectively control access to it configuration file and, among other things, prevent malicious write operations to sensitive configuration data.

The invention can be implemented in numerous ways, including, for example, a method, an apparatus, a computer readable (and/or storable) medium, and a computing system (e.g., a computing device). A computer readable medium can, for example, include at least executable computer program code stored in a tangible form. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 1A depicts a computing environment in accordance with one embodiment of the invention.

DETAILED DESCRIPTION OF THE INVENTION

Figure 1B:
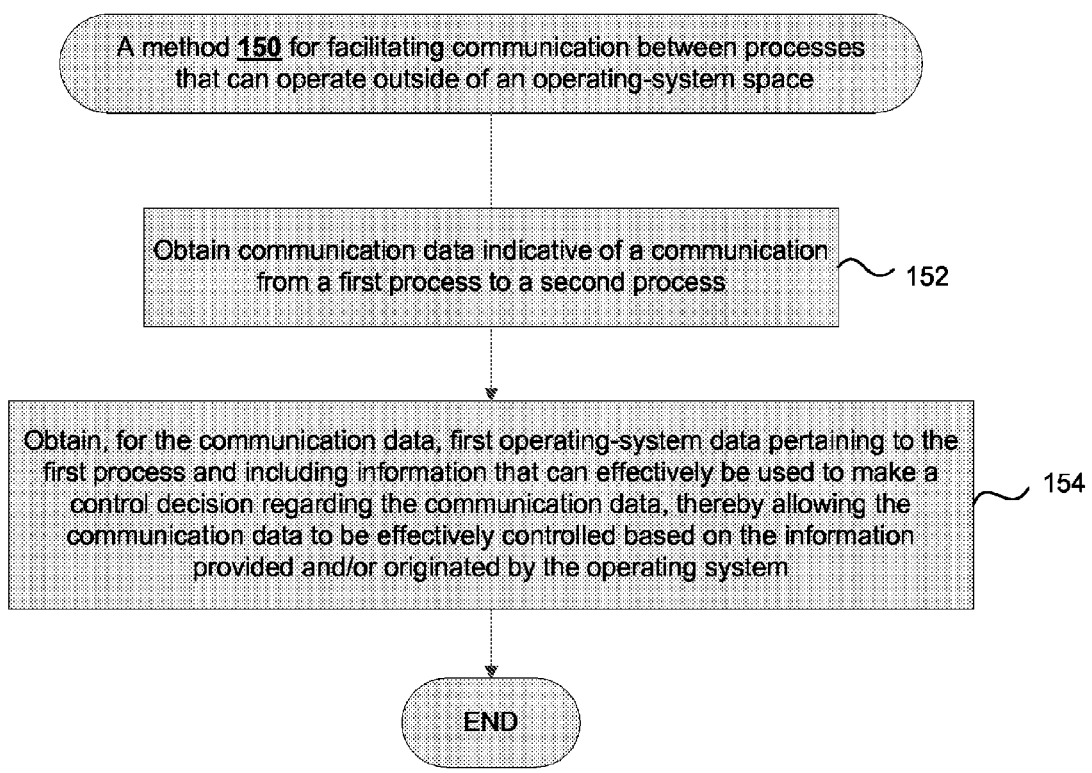
FIG. 1B depicts a method for facilitating communication between processes that can operate outside an operating-system space in accordance with one embodiment of the invention.

As noted in the background section, computing systems are becoming increasing more popular. As such, techniques that can improve computing systems would be useful.

Today, security of computing systems is a major concern. One such security concern pertains to Inter-Process Communication (IPC). As noted above, Inter-Process Communication (IPC) can refer to communication (or exchange of data) between multiple processes and/or threads. As generally known in the art, IPC is an important aspect of computing systems, especially those supporting relatively large numbers of processes. Furthermore, it is desirable at least in some situations to provide Inter-Process Communication (IPC) mechanism that operate outside the operating-system space (e.g., user space) rather than inside the operating-system space (e.g., kernel space). Providing an Inter-Process Communication (IPC) mechanism outside of the operating-system space may be a design choice, and could, among other things, allow the operating system and consequently the computing system to be relatively more efficient. In addition, Inter-Process Communication (IPC) mechanisms operating outside of the operating system may be relatively more flexible and/or may be more widely used in more modern computing systems.

One example of an Inter-Process Communication (IPC) mechanism that can operate outside the operating-system space is generally known in the art as "D-Bus." D-Bus can be provided as a "daemon" process operating in the background to effectively facilitate exchange of IPC messages between processes that can also operate outside the operating-system space. These processes can also be "daemon" processes operating in the background and capable of providing various services. For example, a first process operating in user space (outside of the operating-system space) can effectively use a D-Bus daemon process to communicate with a "GConf" daemon process, as generally known in the art. The first process can, for example, effectively send a write request in the form of an IPC message, or more specifically, a D-Bus message in order to write to a configuration file managed by the "GConf" daemon process.

Conventional Inter-Process Communication (IPC) mechanisms including various conventional D-bus mechanisms are highly useful and appreciated. However, these conventional mechanisms may not allow controlling access in a secure manner. Generally, more conventional Inter-Process Communication (IPC) mechanisms may effectively just pass messages from one process to another and offer no significant measure of security by the IPC mechanism. Even relatively more secure conventional IPC mechanisms may rely on the information provided by processes operating outside of the operating system (e.g., user processes). Generally, such information is not as reliable as the information provided or originated by the operating system.

By way of example, conventional "D-Bus" mechanisms that offer some measure of security can rely on the information provided by user. As a result, security decisions may be made based on information that may be not be accurate and/or maliciously false. Today, this approach may not be ideal given the prevailing security concerns, especially for computing environments that may use relatively large numbers of user application programs and consequently user processes that may have been originated from various entities.

Accordingly, techniques that can improve the security of computing systems, and in particular the security of Inter-Process Communication (IPC) are needed.

The invention pertains to techniques for allowing communication between processes (or Inter-Process Communication) operating in computing environments and/or computing systems. It will be appreciated that the techniques, among other things, can provide more secure computing environments and/or computing systems by allowing Inter-Process Communication (IPC) to be controlled in a more secure manner.

In accordance with one aspect of the invention, a communication component operating outside of an operating system can obtain operating-system data pertaining to a first process operating in a computing environment and/or system. It will be appreciated that the operating-system data can include information that can be effectively used to make a control decision in the computing environment and/or system (e.g., an access control decision to determine whether to allow the first process to access a protected resource, such as, for example, a file). Moreover, the operating-system data can include information that is more reliable than the information provided by less reliable sources including the first process, thereby allowing better control and consequently a more secure computing environment and/or system. By way of example, the operating-system data can include security information that can be used to make a control decision (e.g., security context of the first process, one or more security policies, rules and/or conditions) and/or information that can be used to obtain the information needed to make a security decision (e.g., a process identifier that can be used to obtain the security context of the process).

In accordance with one embodiment of the invention, a communication component operating outside of an operating-system space can obtain communication data indicative of a communication from a first process also operating outside of the operating-system space. The communication component can also be operable to obtain, for the communication message, first operating-system data pertaining to the first process. The first operating-system data can include information that can effectively be used to make a control decision regarding the communication data originated by the first process.

Moreover, the first operating-system data can be effectively provided and/or be originated by the operating system and it can therefore be more reliable than the information that might have been provided and/or originated by less reliable sources including the first process, thereby allowing communication data to be controlled based on more reliable information. By way of example, the first operating-system data can include a process identifier for the first process. The communication component can, for example, obtain the process identifier from the operating system. In some situations, the process identifier may already be known and/or already available, for example, based on a connection (or virtual connection) between the first process and the communication component such connections can be made and/or maintained by the operating system (e.g., a socket connection that is originated and/or maintained by the operating system).

In accordance with a related aspect of the invention, a communication component can be operable to make a control decision regarding the communication data based on the information provided and/or originated by the operating system. By way of example, the communication component can be operable to effectively disregard the communication data by not forwarding it to an intended recipient, namely, a second process also operating outside of the operating-system space. This decision can, for example, be made based on the process identifier of the sender process that has originated the communication data. However, it should be noted that the process identifier would be provided and/or originated by the operating system.

In accordance with another related aspect of the invention, a communication component can be operable to effectively provide the operating-system data pertaining to a first process to its intended recipient, namely, a second process also operating outside of the operating-system space. As noted above, the first operating-system data can include information that can effectively be used to make a control decision regarding the communication data originated by the first process. As such, the recipient (or second) process can use the first operating-system data to make a control decision regarding the communication data. Moreover, this control decision can be made based on information that is more reliable than the information that may have been provided and/or originated by less reliable sources including the first process because the first operating-system data can be effectively provided and/or originated by the operating system.

In accordance with yet another related aspect of the invention, a recipient (or second) process can be operable to obtain the operating-system data pertaining to a sender (or first) process from the communication data effectively provided to it, for example, by a communication component operating outside the operating-system space of the operating system in accordance with a related aspect as noted above. Moreover, the recipient (or second) process can make a control decision regarding the communication data originated by the sender (or first) process based on the operating-system data effectively provided and/or originated by the operating system.

In accordance with one embodiment of the invention, the recipient (or second) process can obtain a first process identifier of the sender (or first) process from the communication data (e.g., an IPC message). The first process identifier can, for example, be obtained and effectively provided by a communication component (e.g., a daemon process) to the recipient (or second) process in accordance with a related embodiment of the invention. In any case, the first process identifier can represent a process identifier provided and/or originated by the operating system. The recipient (or second) process can use the first process identifier to obtain information needed to make a control decision regarding the communication data originated by the sender (or first) process. By way of example, the recipient (or second) process can obtain a security context from the operating system based the process identifier of the sender (or first) process. In other words, the recipient (or second) process can be ensured that the identity of the first process has been provided by a reliable source, namely, the operating system, and then proceed to obtain the security context of the process from the operating system itself. In addition, the recipient (or second) process can be operable to obtain other security information including one or more security policies, rules and/or condition from the operating system and make a control decisions regarding the communication data in a similar manner as the operating system would.

Those skilled in the art will especially appreciate that a "D-Bus" daemon process can effectively modify "D-Bus" messages received from sending processes to include the process identifier of sending processes operating in user space in accordance with one embodiment of the invention. In addition, a "GConf" daemon process can be operable to receive a modified "D-Bus" message and use the process identifier provided by the modified "D-Bus" message in order to obtain the security context of the process identified by the process identifier (e.g., the sender process). The "GConf" daemon process can also be operable to obtain one or more access control policies, rules and/or conditions from the operating system. Moreover, the "GConf" daemon process can be operable to effectively provide an access control mechanism based on more reliable security information, provided by the operating system, similar to access control mechanisms provided by some operating systems (e.g., a Mandatory Access Mechanism (MAC) mechanism of a Secure Linux Operating System (or SELinux Operating System). Those skilled in the art will also appreciate that the "D-Bus" and "GConf" daemon processes (or a "GConfd") can operate in a SELinux Operating Environment, thereby allowing leveraging the security features of the SELinux Operating System, including the security features that may be developed in the future, as a "GConf" daemon process may be operable to obtain them from the SELinux kernel (or internals) in accordance with the invention. As a result, a "GConf" daemon processes can be operable to effectively control access to it configuration file and, among other things, prevent malicious write operations to sensitive configuration data.

Embodiments of these aspects of the invention are discussed below with reference to FIGS. 1A-5. However, those skilled in the art will readily appreciate that the detailed description given herein with respect to these figures is for explanatory purposes as the invention extends beyond these limited embodiments.

FIG. 1A depicts a computing environment 100 in accordance with one embodiment of the invention. Referring to FIG. 1A, a communication component 102 can be operable to facilitate communication between a first process 104 and a second process 106. It should be noted that the first and second processes (104 and 106) are operable outside an operating system space 108 where an operating system 109 can operate. As know in the art, the operating system 108 can, for example, be an operating system provided for a computing system (e.g., a computing device, such as a personal computer (PC) or a mobile phone or a laptop). As such, those skilled in the art will appreciate that the first and second processes 104 and 106 can be processes that operate for or on a computing system; and the communication component 102 can, for example, be provided as a process, a daemon process that can run in the background to perform various tasks.

As noted above, a communication component 102 can be operable to facilitate communication between the first process 104 and the second process 106. More particularly, the communication component 102 can also be operable outside the operating system space 108 and effectively obtain communication data 110 (e.g., receive communication data 110 as a message from the first process 104). Generally, the communication data 110 can be indicative of a communication from the first process 104 to the second process 106 which are both operating outside the operating system space 108. By way of example, the communication data 110 can be an Inter-Process Communication message (IPC message) as will be known to those skilled in the art.

After obtaining the communication data 110, the communication component 102 can be operable to obtain a first operating-system data 112 for the communication data 110 associated with the first process 104.

It will be appreciated that the operating-system data 112 can include data (or information) effectively provided and/or originated by the operating system 109. Moreover, the data provided and/or originated by the operation system can be effectively used to make a control decision regarding the communication data 110. This allows controlling the communication data 110 based on the information provided by the operating system 109 rather than information that may be provided and/or originated by the first process 104 or another entity or source. Such communication control mechanism is specially useful when the operating system 109 is considered to be more secure and/or reliable than the first process 104 or another entity/source, thereby effectively allowing the communication data 110 to be controlled more securely and/or reliably than it would be if information provided and/or originated by the first process 104 or a source considered as reliable by the operating system 109 is used. Generally speaking, an operating system is considered to be more reliable than processes operating outside the operating system space (e.g., "user space" processes as is known in the art). Furthermore, it will be appreciated that the operating system 109 can, for example, be provided as a safe operating system (e.g., a "Trusted" operating system as is known in the art) to further enhance the underlying security and reliability of the system.

Referring back to FIG. 1A, communication control decisions can be effectively made by a communication control component 102a of the communication component 102. The communication control component 102a can effectively control the communication data 110 based on the operating-system data 112 pertaining to the first process 104. The operating-system data 112 can, for example, be effectively generated, maintained and/or secured by the operating system 109. As such, the operating-system data 112 can, for example, be and/or include a process identifier (e.g., a process identifier) of the first process 104, context information including the security context of the first process 104, policies, rules and/or conditions including security policies, rules and/or conditions pertaining to controlling communication in the computing environment 100. More particularly, such information can be used to control the communication data 110 depicted in FIG. 1A. By way of example, the communication control 102a can be operable to determine whether to communicate the communication data 110 to the second process 106 or not. As such, the communication control 102a can, for example, determine not to forward the communication data 110 to the second process 106, thereby preventing the first process 104 from communicating the communication data 110 to the second process 106.

As another example, the communication control 102a can effectively modify the communication data 110 so that it includes the operating-system data 112. Referring back to FIG. 1A, a modified communication data 115 that includes the communication data 110 and the operating-system data 112 can be effectively forwarded by the communication component 102 to the second process 106, thereby allowing a communication control 106b of the second process to make a control decision regarding the communication data 110. It will be appreciated that the communication data 110 can, for example, effectively be and/or include a request for accessing an accessible component 116. As such, the communication control 102a of the communication component 102, by not forwarding the communication data, can effectively deny the first process 104 access to the accessible component 116.

It should be noted that based on the operating-system data 112, the communication control 106b of the second process 106 can also effectively deny the first process 104 access to the accessible component 116. More generally, the communication control 106b can make a communication control decision including, for example, not forwarding the communication data 110 to another component (not shown) and/or not allowing the first process 104 to access a resource outside the operating system space 106 (not shown).

It will be appreciated that communication control decisions including access control decisions can, for example, be made by the communication control 102a and/or communication control 106b, at least partially based on the perceived safety of the processes in the computing environment 100. As such, communication data (CD3) 122 associated with the third process 120 can, for example, be treated differently than the communication data 110 associated with a first process 104 based on the perceived level of safety. By way of example, the first process 104 can be considered to be safe or a safe process (e.g., a trusted process). As such, the first process 104 may ultimately be granted access to the accessible component 116. On the other hand, the third process 120 can, for example, be a process not considered to be safe or an unsafe process (e.g., a process that is not trusted), and as such, denied access to the accessible component 116. Access to the accessible component 116 can be denied by the communication component 102 by not forwarding the communication data 122 to the second process 106 and/or ultimately by the second process 106. In either case, access to the accessible component 116 can be granted or denied based on the operating-system data (OS-Data 3) 124 pertaining to the third process 120. It should be noted that the operating-system data 124 can be effectively obtained and provided by the communication component 102 to the second process 106.

Those skilled in the art will appreciate that the communication component 102 and/or second process 106 can, for example, be provided as executable computer program code that is stored in a computer readable storage medium. Furthermore, the computing environment 100 can be provided for a computing system that includes one or more processors and memories (not shown). Those skilled in the art will also appreciate that the communication component 102 can, for example, be provided as an Inter-Process Communication (IPC) component or mechanism (e.g., an IPC process) operable to facilitate communication of IPC messages within the computing environment 100.

FIG. 1B depicts a method 150 for facilitating communication between processes that can operate outside an operating-system space in accordance with one embodiment of the invention. Method 150 can, for example, be performed by the communication component 102 and/or the second process 106 depicted in FIG. 1A. Referring to FIG. 1B, initially, communication data is obtained (152). It should be noted that the communication data is indicative of a communication from a first process to a second process. The first and second processes both operate outside of operating-system space where an operating system can operate for a computing system. Referring back to FIG. 1B, after communication data is obtained (152), first operating-system data pertaining to the first process is obtained (154). It should be noted that the first operating-system data includes information that can effectively be used to make a control decision regarding the communication data. It should also be noted that the first operating-system data is provided and/or originated by the operating system, thereby allowing the communication data to be effectively controlled based on the information provided and/or originated by the operating system. The method 150 ends after the first operating-system data is obtained (154) for the communication data.

As noted above, the communication component 102 (depicted in FIG. 1A) can, for example, be provided as an Inter-Process Communication (IPC) component operable to facilitate communication of IPC messages within the computing environment 100 depicted in FIG. 1A.

Figure 2A:
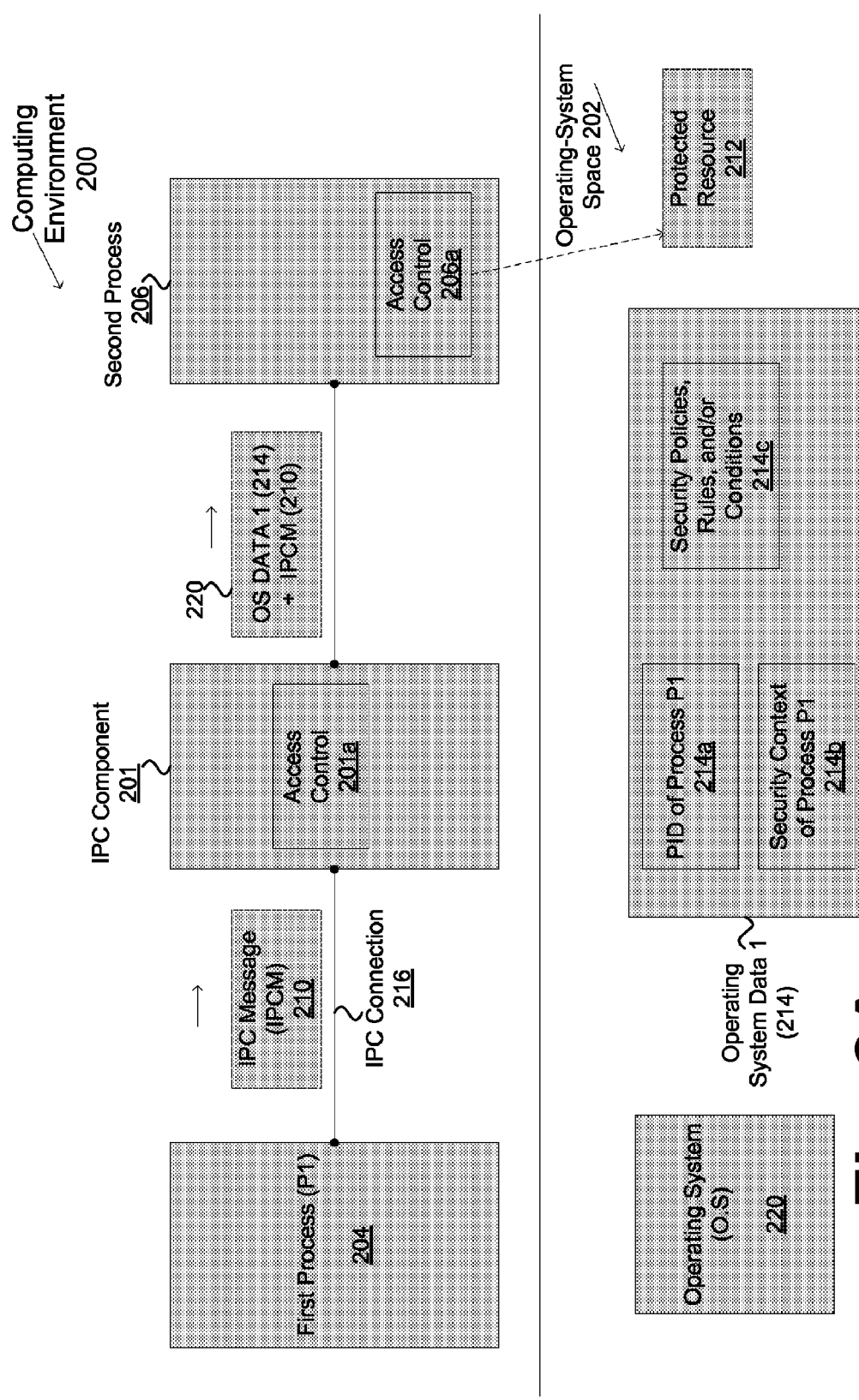
FIG. 2A depicts an Inter-Process Communication (IPC) component 201 in accordance with one embodiment of the invention.

To further elaborate, FIG. 2A depicts an Inter-Process Communication (IPC) component 201 in accordance with one embodiment of the invention. Referring to FIG. 2, IPC component 201 can operate outside an operating system space 202 to effectively facilitate communication of IPC messages between first and second processes 204 and 206 also operating outside the operating system space 202 of the computing environment 200. An IPC message 210 can, for example, effectively be used and/or result in accessing a protected resource of the computing environment 200. Access can include performing an access operation (e.g., write, read open) on the accessible resource. Given the prevalence of use of IPC messages as a mechanism for accessing resources, and in particular, importance of security concerns regarding protection of secured resources, use of IPC messages with respect to accessing of protected resources will be described in greater detail.

Referring back to FIG. 2A, the first process 204 can effectively generate an IPC message 210 and send it to the IPC component 201. The IPC message 210 can be addressed to the second process 206 and effectively requests access to a protected resource 212. By way of example, the IPC message 210 can be a request for a write operation to a file (e.g., a configuration file) that can be accessed by the second process 206. In any case, the IPC component 201 can be operable to obtain operating-system data 214 pertaining to the first process 204. As shown in FIG. 2A, the operating-system data 214 can, for example, include a process identifier (pid) 214a, a security context 214b, and one or more security policies, rules and/or conditions 214c. In general, the operating-system data 214 pertaining to the first process 204 can be provided and/or originated by an operating system 220 operating in the operating system space 202. It should be noted that the IPC component 201 can, for example, obtain the operating-system data 214 directly from the operating system 220. In addition or in the alternative, the operating-system data 214 can be already available and/or effectively known to the IPC component 201. By way of example, the IPC component 201 may already have access to the process identifier of the first process 204 based on the IPC connection 216. The IPC connection 216 can be established and maintained by the operating system 220. As such, the IPC component 201 may readily have access and/or effectively know at least a portion of the operating-system data 214 that has been generated by the operating system 220. As will be appreciated by those skilled in the art, the IPC connection 216 can, for example, be and/or be facilitated by: a Unix domain socket (UDS), an IPC socket Inter-Process Communication (IPC) socket, a file, a signal, a socket, a pipe, a named pipe, semaphores, shared memory, message passing, memory-mapped file, message queue and mailbox.

In any case, an access control component 201a of the IPC component 201 can be operable to effectively make an access decision regarding the IPC message 210 based on the operating-system data 214. By way of example, the IPC component 201 may effectively decide not to forward the IPC message 210 based on the process identifier 214a of the first process 204. As another example, the IPC component 201 can make an access control decision based on the security context 214b of the first process 204. This access control decision can, for example, be made based on one or more security policies, rules, and/or conditions 214c which can be obtained directly from the operating system 220 based on the process identifier 214a. The IPC component 201 may also be operable to effectively modify the IPC message 210 so that it includes at least a part of the operating-system data 214 (e.g., add the process identifier 214a) and generate a modified IPC message 220. This approach allows the second process 206 to make an access control decision with respect to the protected resource 212 based on the operating-system data provided by the modified IPC message 220. In other words, the second process 206 can effectively use the operating-system data 214 to determine whether to allow the first process 204 to access the protected resource 212. The second process 206 may also be operable to obtain additional operating-system data pertaining to the process 204. By way of example, the modified IPC message 220 can provide the process identifier 214a which can be used by the second process 206 to obtain the security context 214b and/or one or more security policies, rules, and/or conditions 214c pertaining to the first process 204.

Referring to FIG. 2A, an access control component 206a of the second process 206 can be operable to effectively determine whether the first process P1 should be granted access to the protected resource 212. It should be noted that making access control decisions by the IPC component 201 may require having additional information pertaining to the second process 206 and/or the protected resource 212. The IPC component 201 can, for example, be operable to obtain such information from the second process 206 and/or the operating system 220. However, it may be more desirable and/or feasible at least in some situations to allow the second process 206 to make access control decisions regarding resources including a protected resource, such as, the protected resource 212 depicted in FIG. 2A. As such, this particular approach is discussed in greater detail below.

Those skilled in the art will readily appreciate that the IPC component 201 and/or the second process 206 depicted in FIG. 2A can, for example, be provided as a computer readable medium including computer readable storage medium storing executable computer program code in accordance with one embodiment of the invention.

Figure 2B:
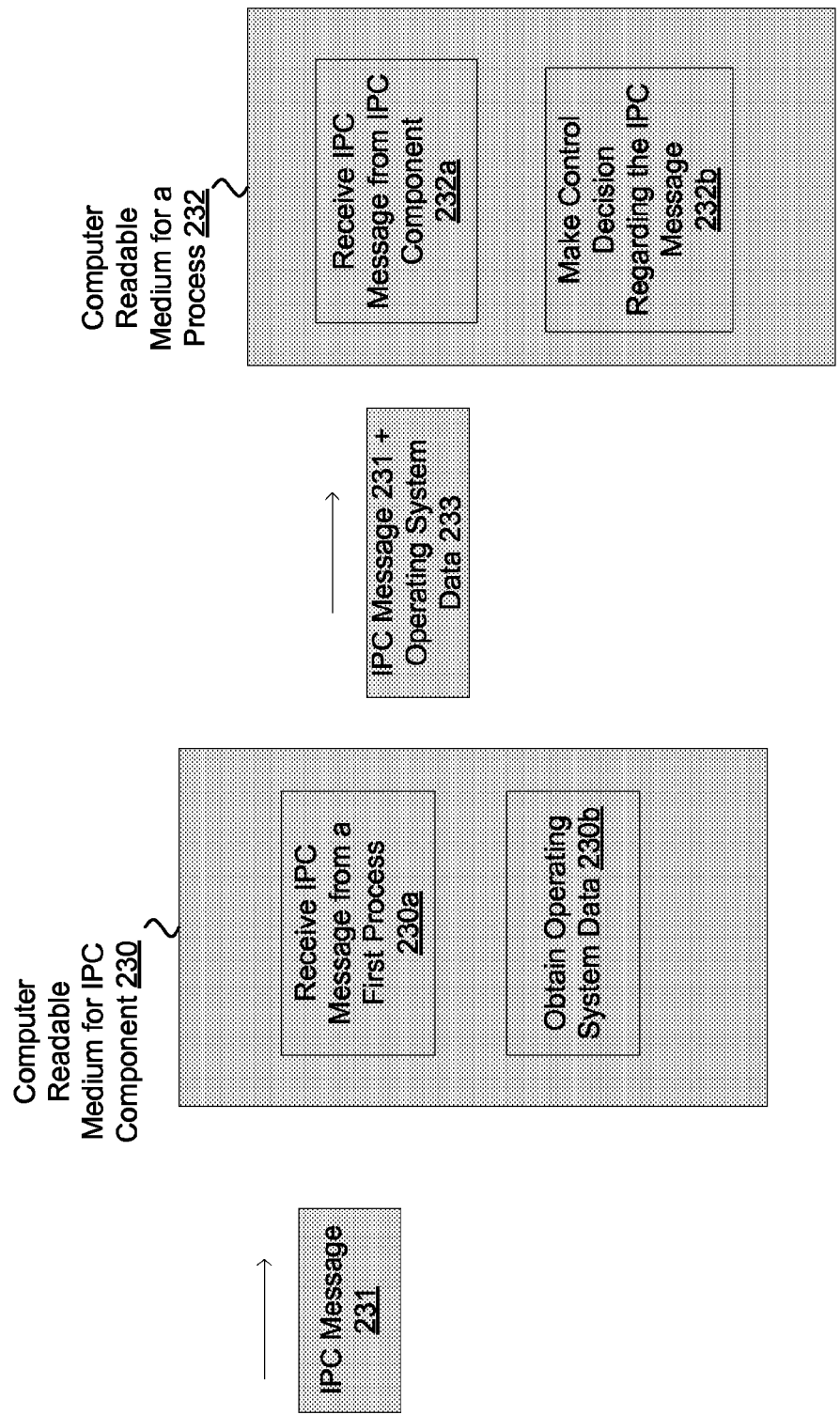
FIG. 2B depicts computer readable mediums for an IPC component and a process in accordance with one embodiment of the invention.

To further elaborate, FIG. 2B depicts computer readable mediums 230 and 232 for an IPC component 230 and a process 232 in accordance with one embodiment of the invention. The computer readable medium for the IPC component 230 can, for example, be embodied in a tangible form and include executable computer program code operable to receive an Inter-Process Communication (IPC) message 231. The IPC message 231 can be received from a first process operating outside of an operating-system space where an operating system operates for a computing system. Typically, the IPC message 231 is indicative of an Inter-Process Communication from the first process to a second process also operating outside the operating-system space. Referring to FIG. 2B, a computer readable medium for the IPC component 230 can also include executable computer program code operable to obtain, for the IPC message, first operating-system data pertaining to the first process. Typically, the operating-system data has been effectively provided and/or originated by the operating system and it can be used to make a communication control decision regarding the IPC message in order to secure a computing system that uses the operating system. Referring back to FIG. 2B, the computer readable medium or the process 232 can include executable computer program code operable to receive an IPC message 233 from the Inter-Process Communication (IPC) component 230 represented and stored by the computer readable medium 230. The IPC message 233 include first operating-system data pertaining to a first process that has effectively sent the IPC message 231 to the IPC component represented and stored by the computer readable medium 230. As noted above, the first operating-system data can include information that can be effectively used to make a control decision regarding the Inter-Process Communication message.

Referring back to FIG. 2B, the computer readable medium for the process 232 can also include executable computer program code operable to effectively make a control decision regarding the IPC message at least partially based on the first operating-system data of the IPC message.

Figure 2C:
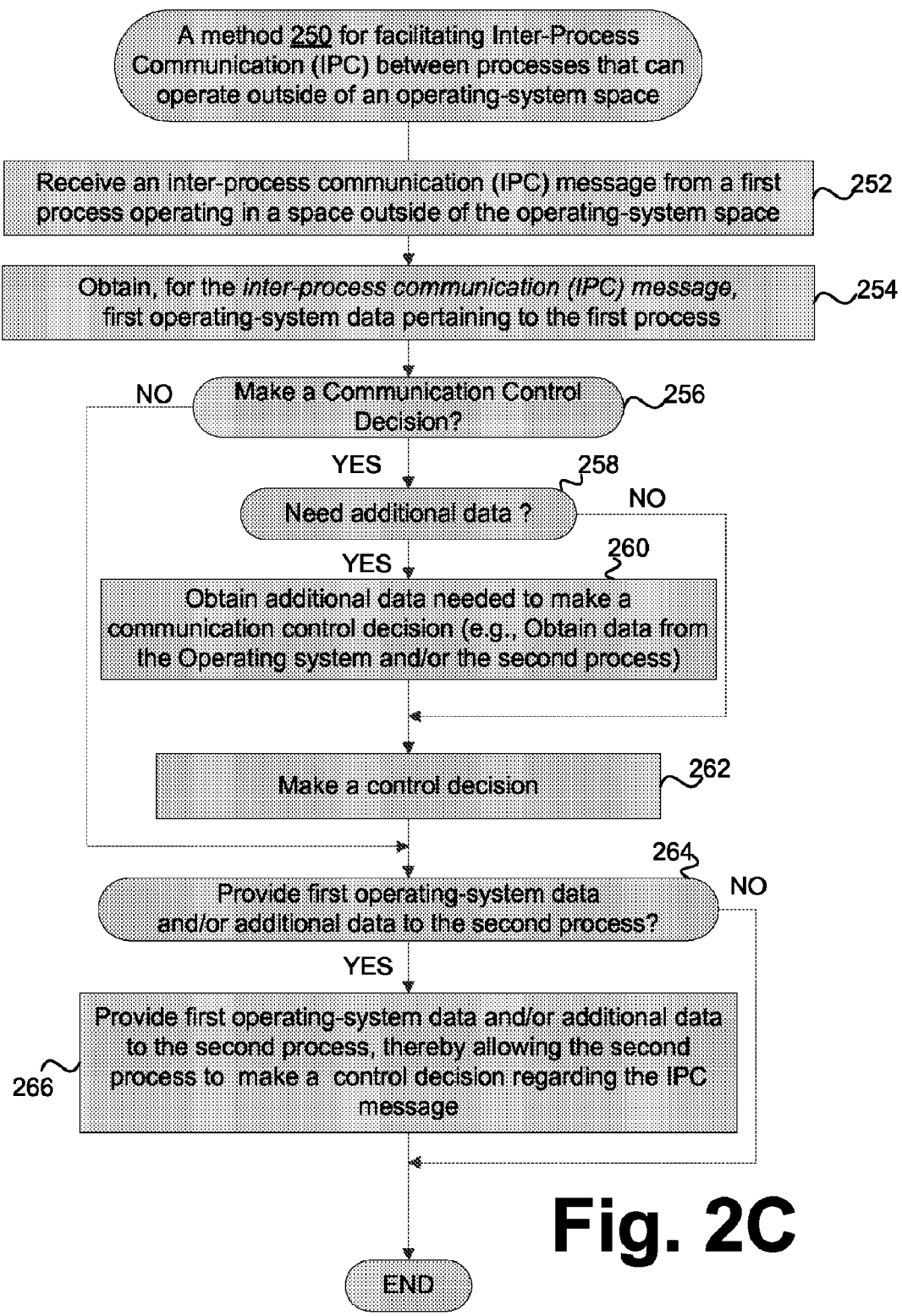
FIG. 2C depicts a method for facilitating Inter-Process Communication (IPC) between processes that can operate outside an operating-system space in accordance with one embodiment of the invention.

FIG. 2C depicts a method 250 for facilitating Inter-Process Communication (IPC) between processes that can operate outside an operating-system space in accordance with one embodiment of the invention. The method 250 can, for example, be performed by the IPC component 201 depicted in FIG. 2A. Referring to FIG. 2C, initially, an Inter-Process Communication (IPC) message is received (252). The IPC message is received from a first process operating in a space outside of the operating-system space where an operating system can operate for a computing system (252). Next, first operating-system data pertaining to the first process is obtained for the IPC message (254). Thereafter, it is determined (256) whether to make a control decision regarding the IPC message. Those skilled in the art will readily appreciate that the determination (256) can, for example, represent a design choice and/or be made based on various criteria including, for example, the type of message and/or the process that generates the IPC message. If it is determined (256) to make a control decision, it is determined (258) whether additional data is needed to make the control decision. Accordingly, additional data can be obtained (260) if it is determined (258) that additional data is needed. By way of example, additional data regarding the first process can be obtained from the operating system and/or a second process associated with the IPC message. Typically, the IPC message from the first process is addressed and intended to be processed by a second process. Generally, a control decision can be made (262) if it is determined (256) to make a control decision with or without additional data. In other words, a control decision can be made (256) at least partially based on the first operating-system data pertaining to the first process. If it is determined not to make a control decision (256) or after a control decision has been made (262), it can be determined (264) whether to provide the first operating-system data and/or any additional data to the second process. Generally, first operating-system data pertaining to the first process and/or any additional data can be provided (266) if it is determined (264) to do so, thereby allowing the second process to make a control decision regarding the IPC message.

It should be noted that determining (264) whether to provide the first operating-system data and/or additional data to the second process can, for example, represent a design choice and/or decision made based on various criteria including, for example, the type of the IPC message, the first process and/or the second process associated with the IPC message. The control decision (262) can, for example, include determining whether to forward or not forward, and whether to allow or deny the IPC message, the first process to access a component of the computing system.

Figure 2D:
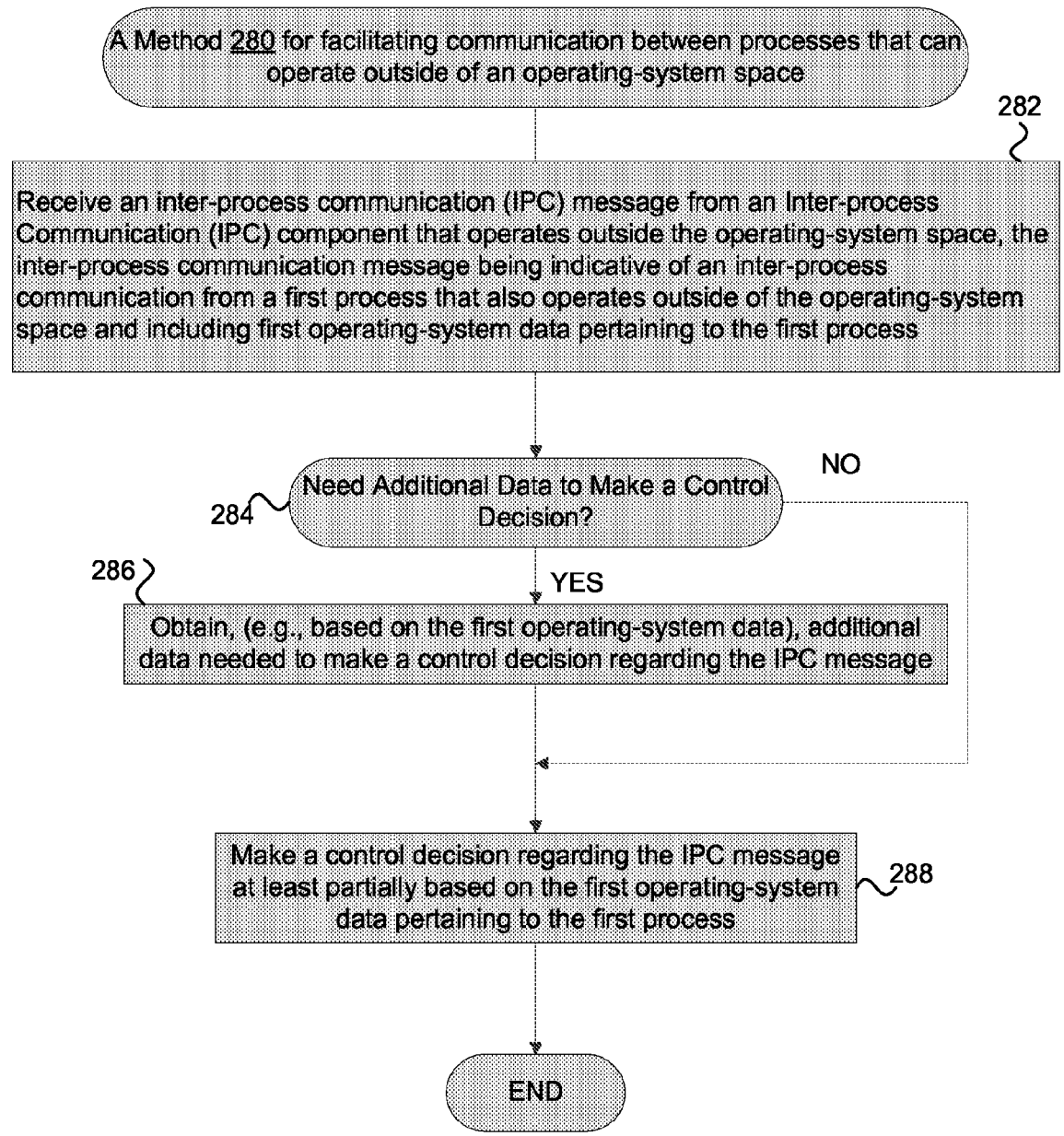
FIG. 2D depicts a method for facilitating communication between processes that can operate outside an operating-system space in accordance with one embodiment of the invention.

FIG. 2D depicts a method 280 for facilitating communication between processes that can operate outside an operating-system space in accordance with one embodiment of the invention. The method 280, can for example, be performed, by the second process 206 depicted in FIG. 2A. Referring to FIG. 2D, an Inter-Process Communication (IPC) message is received (282) from an Inter-Process Communication (IPC) component that operates outside the operating system. It should be noted that the IPC message is indicative of an Inter-Process Communication from a first process that also operates outside the operating-system space. Moreover, the IPC message includes first operating-system data pertaining to the first process. By way of example, the IPC message can include a process identifier (e.g., a process ID as generally known in the art) of the first process. Referring back to FIG. 2D, after receiving the IPC message, it is determined (284) whether additional data is needed to make a control decision regarding the IPC message. Accordingly, additional data can be obtained (286) if it is determined (284) that additional data is needed in order to make a control decision. Additional information can, for example, be obtained based on the first operating-system data provided by the IPC message. By way of example, if the IPC message includes a process identifier of the first process, additional information including security context for the first process and/or one or more security rules can be obtained from the operating system in order to make a control decision. As noted above, a control decision can, for example, include determining whether to grant the first process access to a resource. As such, the security context of the first process and one or more security rules can be obtained in order to determine whether to allow the first process to access an accessible resource (e.g., a protected resource, such as for example, a configuration file). Referring back to FIG. 2D, the control decision regarding the IPC message can be made (288) at least partially based on the first operating-system data pertaining to the first process. The method 280 ends after a control decision has been made (288).

Figure 3:
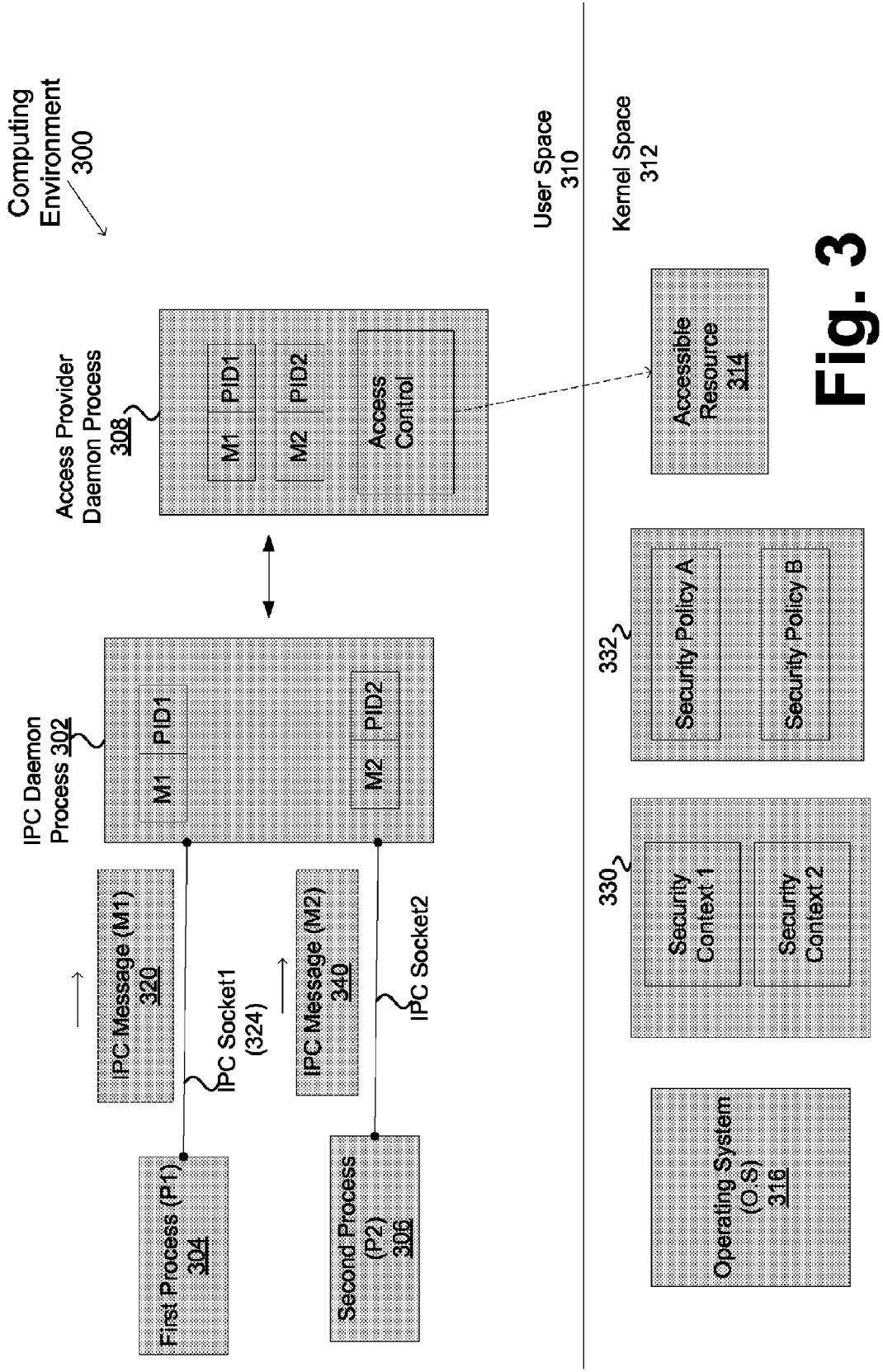
FIG. 3 depicts a computing environment in accordance with yet another embodiment of the invention.

FIG. 3 depicts a computing environment 300 in accordance with yet another embodiment of the invention. Referring to FIG. 3, an IPC daemon process 302 is operable to facilitate communication between processes 304 and 306 and an access provider daemon process 308. It should be noted that each one of the processes 304, 306 and 308 operate in a user space 310 outside of the kernel space 312 where an operating system 316 operates. Moreover, the IPC daemon process 302 can be operable to effectively facilitate access control in the computing environment 300 in order to effectively secure the computing environment 300. More particularly, the IPC daemon process 302 can be operable to effectively provide the access provider daemon process 308 with a process identifier (PID1) of the first process 304 and a process identifier (PID2) of the second process 306. The access provider daemon process 308 can effectively use the process identifiers (PID1 and PID2) to obtain the information it needs to make an access control decision with respect to an accessible resource 314.

Initially, the first process 304 can effectively request access to the accessible resource 314 by sending the IPC daemon process 302 a first IPC message (M1) 320. The IPC message (M1) 320 can be addressed to the access provider daemon process 308 and effectively request an operation (e.g., request a write operation to an accessible resource 314). The IPC daemon process 302 can effectively obtain the process identifier of the first process 304 in order to generate a first modified IPC message 322 for the first IPC message (M1) 320 received from the first process 304. Those skilled in the art will readily appreciate that the IPC daemon process 302 can, for example, obtain a process identifier of the first process 304 based on the information already available from an IPC socket connection 324 which has been established and/or maintained by the operating system 316 or request the process identifier from the operating system. In any case, the process identifier of the first process (PID1) 304 is the process identifier used to generate the modified IPC message 322. Those skilled in the art will readily appreciate that the modified IPC message 322 can be stored by the IPC daemon process 302 and made available to the access provider daemon process 308. The access provider daemon process 308 can obtain the first modified IPC message 322 including the first process identifier for the first process 304 and effectively use the first process identifier to obtain additional information it needs to make an access control decision regarding the accessible resource 314. By way of example, the access provider daemon process 308 can effectively obtain the security context 330, one or more security policies, rules and/or conditions 332 based on the process identifier of the first process 304. Similarly, an access control decision can be made by the access provider daemon process 308 regarding a second IPC message 340 effectively generated by a second process 306. More particularly, a second process identifier (PID2) can be provided in a second modified IPC message 340 and used by the access provider daemon process 308 to make an access control decision in order to effectively secure the computing environment 300. By way of example, the access provider daemon process 308 can deny the second process 306 access to the accessible resource 314 but allow the first process 304 to access the accessible resource 314. The first and second processes 304 and 306 can, for example, differ with respect to their perceived level of trust. As such, the first trusted process 304 can, for example, be granted access to the accessible resource 314 as a trusted process but the second process 306 can be denied access to the accessible resource 314 because it is deemed not to be a trusted process (or an "untrusted" process).

Those skilled in the art will readily appreciate that the IPC daemon process 302 can, for example, be provided as a "D-Bus" daemon process (or a D-bus Process) and the access provider daemon process 308 can, for example, be provided as a "GConf" daemon process (or "GConfd"). The operating system 316 can, for example, be a "Security-Enhanced Linux" operating system (or "SELinux").

Figure 4:
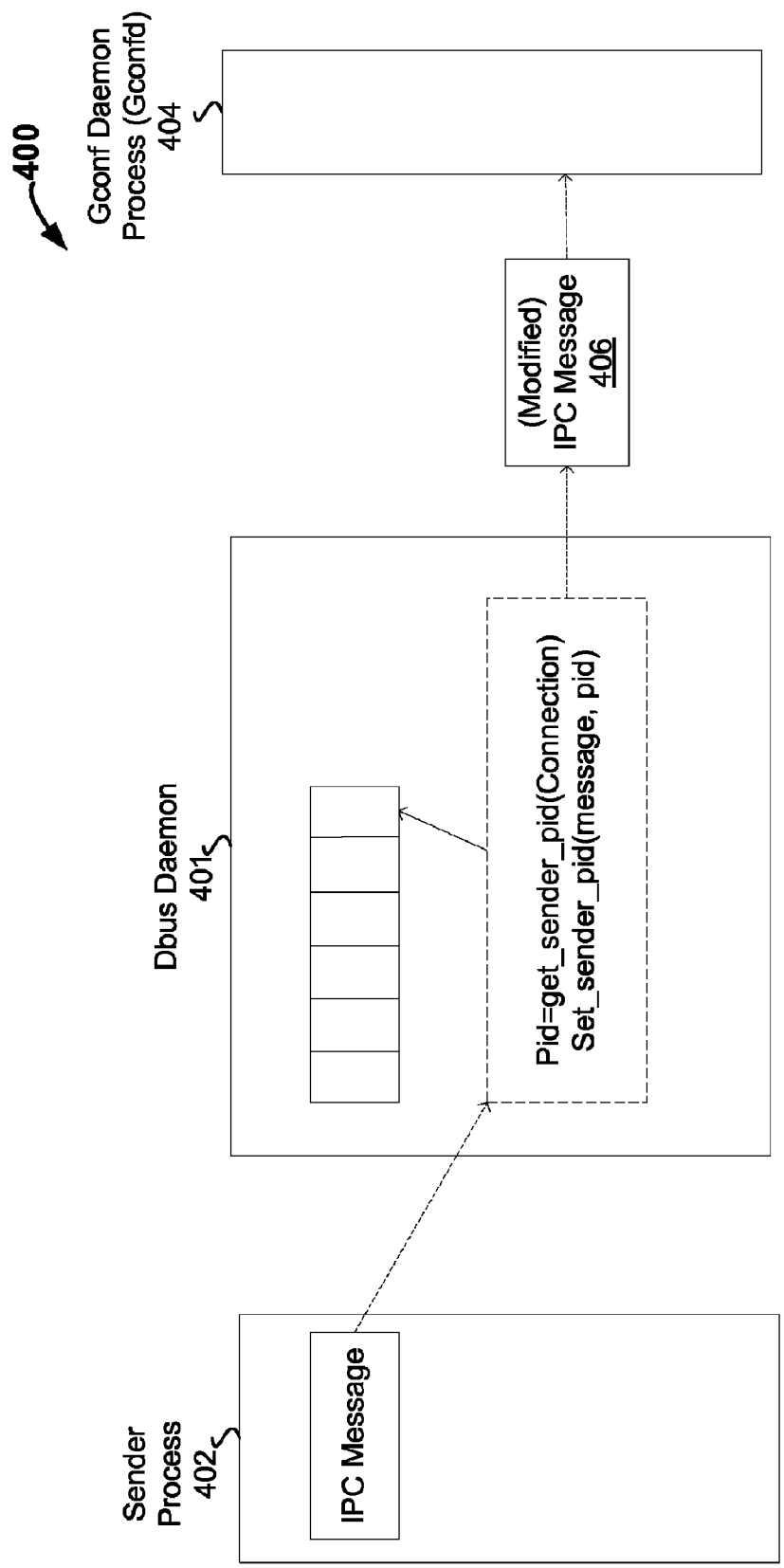
FIG. 4 depicts a "D-Bus" daemon process in a computing environment.

To further elaborate, FIG. 4 depicts a "D-Bus" daemon process 401 in a computing environment 400. Referring to FIG. 4, the "D-Bus" daemon process 401 can facilitate communication between a sender process 402 and a "GConf" daemon process (GConfd) 404 in a secure manner in accordance with one embodiment of the invention. It should be noted that the sender process 402, "D-Bus" daemon process 401, and "GConf" daemon process 404 can operate outside of the operating-system space (e.g., in user space).

In view of the foregoing, those skilled in the art will appreciate that the "D-Bus" daemon process 401 can be operable to determine that the process identifier (or "Pid") of the sender process 402, based on a D-bus connection that effectively connects the sender process 402 to the "D-Bus" daemon process 401. For example, this can be achieved by calling a "get_sender_pid( )" function. The "D-Bus" daemon process 401 can then effectively set a header of a "D-Bus" message 406 with the process identifier (or "Pid") of the sender process 402. For example, this can be achieved by calling a "set_sender_pid( )" function. The "D-Bus" message 406 that includes the process identifier (or "Pid") of the sender process 402 can be effectively forwarded by the D-bus" daemon process 401 to the "GConf" daemon process 404 (GConfd). By way of example, the "D-Bus" message 406 can effectively represent a write operation using a "GConf" key associated with a "GConf" Configuration File managed by the "GConf" daemon process 404; and, as such, it can be forwarded by the by the D-bus" daemon process 401 to the "GConf" daemon process 404. The "GConf" daemon process 404 can effectively obtain the process identifier (or "Pid") of the sender process 402 from the "D-Bus" message 406 and use the process identifier to obtain the security context of the sender process 402 from the operating system. This can be achieved, for example, by using a "getpidcon( )" function that may already be available. In the case of SELinux Operating System, the "getpidcon( )" function can be available from a library (libselinux), as will be known to those skilled in the art. Moreover, those skilled in the art will appreciate that the "GConf" daemon process 404 can be operable to perform "Access Checks" in a similar manner as a secure Operating System in order to determine whether to allow the sender process 402 to perform a requested operation on the "GConf" Configuration File managed by the "GConf" daemon process 404. This "Access Check" can, for example, be performed using a "check_avc( )" function using the security context of the sending process 402, a key and/or key context associated with the requested operation based on one or more applicable access permissions, policies, rules and/or conditions.

Figure 5:
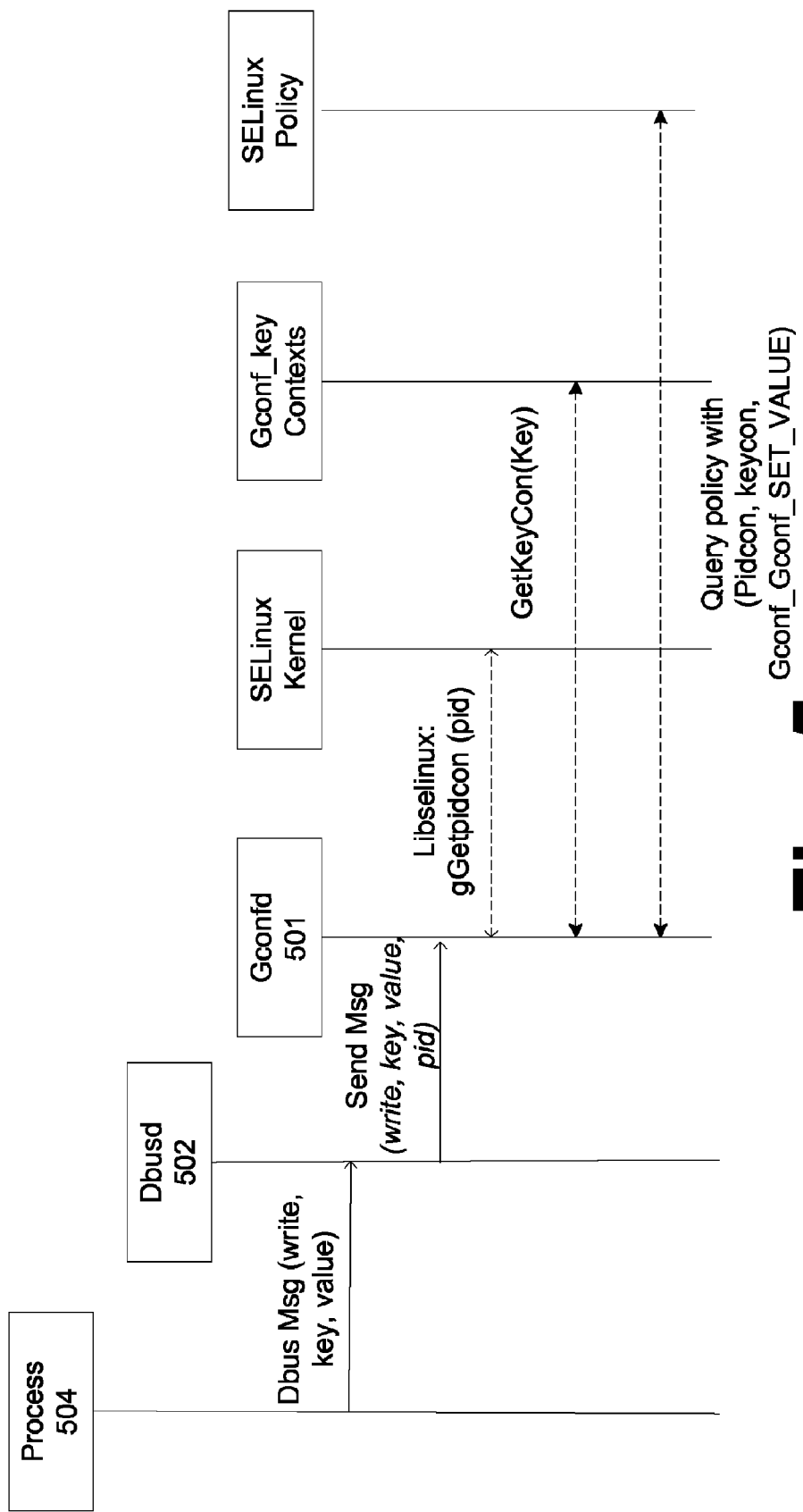
FIG. 5 depicts a process for enforcing Mandatory Access Control (MAC) with respect to operations that can be performed by a "GConf" daemon Process in SELinux Operating Environment in accordance with one embodiment of the invention.

To elaborate even further, FIG. 5 depicts a process for enforcing Mandatory Access Control (MAC) with respect to operations that can be performed by a "GConf" daemon process (GConfd) 501 in SELinux Operating Environment in accordance with one embodiment of the invention. Referring to FIG. 5, a "D-Bus" daemon process 502 can effectively assign the process identifier (pid) of the process 504 to a dbusd message. More particularly, a "Dbus-Message (write, key, value)" function or operation can effectively be transformed to a "Send-Message" (write, key, value, pid) function or operation. The modified "D-bus" message represented by the "Send-Message (write, key, value, pid)" can be received by the GConf daemon Process 501. The GConf daemon process 501 can then make a library call, namely, a "gGetpidcon (pid)" call to get the security context of the process 504 from the SELinux Operating System (or SELinux kernel) based on the process identifier (pid) of the process 504. The "GConf" daemon Process 501 can also obtain the security context of the key using a Getkeycon(key) operation. Subsequently, the "GConf" daemon Process 501 can make a query regarding the applicable security policies that are maintained by the SELinux Operating System. More particularly, a Query can be made form "/etc/selinux/simple/gconf_contexts" using a Queery (Pidcon, keycon, gconf_GCONF_SET_VALUE) function or operation to obtain the security labels of the key. The GConf daemon Process 501 can then make an access Decision based on the information obtained from the SELinux Operating System.

Those skilled in the art will appreciate that conventional "GConf" daemon and "D-Bus" processes can be modified in accordance with the invention. For example, conventional "GConf" daemon and "D-Bus" processes can be modified in accordance with the process for enforcing Mandatory Access Control (MAC) depicted in FIG. 5.

More particularly, a conventional "GConf" daemon process can be modified to effectively allow extending "D-Bus" message header so that it can include a process identifier of process id of a calling (or sending) user process operating in user space.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. In a computing system, a method of facilitating secure communication between processes that operate outside of an operating-system space where an operating system operates for said computing system, by using a communication component that also operates outside of said operating-system space, wherein said method comprises:

obtaining, by said communication component, communication data indicative of a communication message from a first process to a second process, wherein said first and second processes both operate outside of said operating-system space of said computing system;

obtaining, by said communication component, for said communication data, first operating-system data from the operating-system space pertaining to said first process, wherein said first operating-system data is effectively provided and/or originated by said operating-system and includes information including a first process identifier that can effectively be used to make an access control decision regarding said communication data that is and based on the first process identifier associated with said first process, thereby allowing access to said communication data to be effectively controlled based on the information provided and/or originated by said operating system and an identity of the first process; and controlling by said communication component said communication data, Inter-Process Communication (IPC) messages wherein the access control decision is based at least in part on the first process identifier residing in the operating-system space.

2. The method of claim 1, wherein said information further includes a security context for the first process.

3. The method of claim 2, wherein said information further includes security policies, rules, and/or conditions.

4. The method of claim 1, wherein said method further comprises:

determining by said communication mechanism, based on the security information in first operating-system data, whether to allow said communication data to be effectively communicated from said first process to said second process.

5. The method of claim 4, wherein said determining of whether to allow said communication data to be effectively communicated from said first process to said second process comprises one or more of the following:

determining not to forward said communication data to said second process; and not allowing said communication data to be obtained by said second process.

6. The method of claim 1, wherein said communication data is an Inter-Process Communication (IPC) message from said first process to said second process, and wherein said communication component is and/or includes one or more of the following:

a process, an Inter-process Communication (IPC) process, a daemon process, an IPC mechanism, an IPC component, a "Debus" IPC process.

7. The method of claim 1, wherein said first operating-system data pertaining to said first process includes:

a process identifier of said first process;
a security context of said first process; and
one or more control policies, rules, rules and/or conditions pertaining to communication control for controlling communications in said computing system;

wherein said communication component is configured to utilize said process identifier, said security context for said first process, and said one or more control policies, rules, and rules and/or conditions to make an access control decision selected from the group consisting of forwarding said communication data to said second process, preventing said communication data to be obtained by said second process, providing access to resources, and modifying said communication data.

8. The method of claim 1, wherein said obtaining of said first operating-system data pertaining to said first process comprises one or more of following:

obtaining directly from said operating system a first process identifier that can effectively identify said first process;

obtaining, based on a first mechanism, second data and/or said first operating-system data, a first process identifier that effectively identifies said first process, wherein said first mechanism and/or said second data are effectively provided and/or maintained by said operating system.

9. The method of claim 1, wherein said first mechanism and/or second data are and/or include one or more of the following:

a communication link between said first process and said communication component, wherein said communication link is established maintained and/or secured by said operating system;

communication link data associated with said communication link;

a socket between said first process and said communication component, wherein said socket is established maintained and/or secured by said operating system;

a socket established, maintained and/or secured by said operating system;

socket data associated with a socket established, maintained and/or secured by said operating system;

a Unix domain socket (UDS); and an IPC socket Inter-Process Communication (IPC) socket a file, a signal, a socket, a pipe, a named pipe, semaphores, shared memory, message passing, memory-mapped file, message queue and mailbox.

10. The method of claim 9, wherein said operating-system space is and/or includes a kernel space of said computing system, and wherein said communication process and said first and second processes all operate in user spaces outside said kernel space.

11. The method of claim 1, wherein said operating-system is considered to a safe and/or or Trusted operating system.

12. The method of claim 1, wherein said operating-system is considered to be safe operating system, and wherein said first process is not considered to be a safe process.

13. The method of claim 1, wherein said operating-system is considered to be a trusted operating system, and communication control decisions regarding controlling said communication data can at least be partially made based on whether said first and/or second processes are considered to be trusted or not.

14. The method of claim 1, wherein said method further comprises:

effectively providing and/or causing said first operating-system data to be effectively provided to said second process, thereby allowing said second process to effectively control said communication data based on said first operating-system data.

15. The method of claim 14, wherein said method further comprises:
    making a communication control decision, by said second process, regarding said communication data based on context data.

16. The method of claim 15, wherein said making of a said communication decision communication comprises:
    determining whether to allow said first process to effectively access one or more resources of said computing system.

17. The method of claim 1, wherein said second process is and/or includes one or more of the following:
    a process that effectively provides access to one or more resources of said computing system;
    a process that effectively provides access to one or more files of said computing system;
    a process that effectively provides access to one or more configuration files of said computing system
    a daemon process, and
    a "GConf" process providing access to a "GConf" configuration.

18. The method of claim 1, wherein said operating system is and/or includes a SELinux Operating system operable to store and enforce one or more security policies, rules and/or and conditions as a Mandatory Access Control (MAC) mechanism, thereby leveraging the Mandatory Access Control (MAC) mechanism of said SELinux Operating system.

19. A computer readable storage medium storing executable computer program code in a tangible form for an Inter-Process Communication (IPC) component operable in a space outside of an operating-system space where an operating system operates in a computing system, to facilitate communication between processes that are also operable outside said operating system, wherein said computer readable storage medium includes:
    executable computer program code operable to receive an Inter-Process Communication (IPC) message from a first process operating outside of said operating-system space, wherein said Inter-Process Communication message is indicative of an Inter-Process Communication from said first process to a second process also operating in a space outside of said operating-system space; and
    executable computer program code operable to obtain, for said Inter-Process Communication (IPC) message, first operating-system data from the operating-system space pertaining to said first process, wherein said operating-system data includes a process identifier for the first process that has been effectively provided and/or originated by said operating system and can be used to make an access control decision regarding said Inter-Process Communication (IPC) message that is and based on the process identifier of said first process, in order to secure said computing system.

20. The computer readable storage medium of claim 19, wherein said computer readable storage medium further includes:
    executable computer program code operable to obtain one or more security policies, rules and/or conditions for said first process; and
    executable computer program code operable to control said communication data based on said one or more security policies, policies, rules and/or conditions for said first process.

21. The computer readable storage medium of claim 20, wherein said one or more security policies, rules and/or conditions are effectively provided and/or stored by said Inter-Process Communication (IPC) component.

22. The computer readable storage medium of claim 20, wherein said computer readable storage medium further includes one or more of the following:
    executable computer program code operable to obtain operating-system security context data pertaining to security context of said first process, wherein said operating-system security context has been provided and/or originated by said operating system;
    executable computer program code operable to obtain, from said operating system, operating-system security context pertaining to said first process;
    executable computer program code operable to obtain one or more operating system security policies pertaining to said first process, wherein said one or more operating system security policies been provided and/or originated by said operating system;
    executable computer program code operable to obtain security context of said first process from said operating system;
    executable computer program code operable to obtain one or more security policies pertaining to said first process, wherein said one or more security policies been provided and/or originated by said operating system; and
    executable computer program code operable to obtain one or more security policies pertaining to said first process from said operating system
    executable computer program code operable to obtain data pertaining to said second process and needed to control said communication data
    executable computer program code operable to obtain, from said second process, data pertaining to said second process and needed to control said communication data; and
    executable computer program code operable to obtain from, said operating system, data pertaining to said second process and needed to control said communication data.

23. The computer readable storage medium of claim 20, wherein executable computer program code operable to control said communication includes:
    executable computer program code operable to access and/or control access to one or more resources of said computing system.

24. The computer readable storage medium of claim 19, wherein said computer readable storage medium further includes:
    executable computer program code operable to generate a modified Inter-Process Communication message that includes said first operating-system data.

25. The computer readable storage medium of claim 21, wherein said computer readable storage medium further includes:
    executable computer program code operable to obtain a first process identifier for said first process, wherein said first process identifier has been effectively provided and/or originated by said operating system.

26. A computer readable storage medium storing executable computer program code for a process operable in a space outside of an operating-system space where an operating system operates in a computing system, wherein said computer readable storage medium includes:
    executable computer program code operable to receive an Inter-Process Communication message from an Inter-Process Communication (IPC) component that operates outside said operating-system space, wherein said Inter-Process Communication message is indicative of an Inter-Process Communication from a first process that also operates outside of said operating-system space, and wherein said Inter-Process Communication message includes first operating-system data pertaining to said first process, and wherein said first operating-system data has been effectively provided and/or originated by said operating system from the operating-system space based on a process identifier of said first process and includes information that can be effectively used to make an access control decision regarding said Inter-Process Communication message, the first process identifier residing in the operating-system space; and executable computer program code operable to effectively make said control decision regarding said Inter-Process Communication message data at least partially based on first operating-system data of said Inter-Process Communication message.

27. The computer readable storage medium of claim 26, wherein said computer readable storage medium further includes:

executable computer program code operable to obtain from said operating system a security context of said first process.

28. The computer readable storage medium of claim 26, wherein said computer readable storage medium further includes: executable computer program code operable to obtain from said operating system, based on said first process identifier, a security context of said first process.

29. The computer readable storage medium of claim 28, wherein said computer readable storage medium further includes:

executable computer program code operable to obtain from said operating system, based on said security context of said first process, one or more security policies regarding processing said IPC message; and
executable computer program code operable to process said IPC message based on said one or more security policies.

30. The computer readable storage medium of claim 29, wherein said one or more security policies include one or more access control policies regarding accessing one or more assessable resources of said computing system, and wherein said processing of said IPC message includes determining whether to allow said first process to access said one or more assessable resources.

31. The computer readable storage medium of claim 30, wherein said determining of whether to allow said first process to access said one or more assessable resources includes determining whether to allow said process to perform an operation on said one or more assessable resources.

32. The computer readable storage medium of claim 31, wherein said operations include one or more of the following: read, write, open, close, locate, find, execute, call, retrieve, communicate, share, and publish.

33. A computer readable storage medium storing executable computer program code in a tangible for the method recited in claim 1.

34. In a computing system, a method of facilitating communication between a first user process and a daemon process that are both operable in user space, by a process that can also operate in said user space, wherein said method comprises:

receiving, by said process, a first message from said first user process as a first Inter-Process Communication message, wherein said first message is a message to said daemon process and represents a request for an operation to be performed by said daemon process;

obtaining, by said process, a first process identifier for said first process, wherein said first process identifier is effectively generated and/or maintained by an operating system of said computing system; and generating, by said process, a first modified message serving as a modified Inter-Process Communication message that includes said first message and said first process identifier, thereby allowing said daemon process to determine whether to grant said request for said operation based at least on said first process identifier.

35. The method of claim 34, wherein said method further comprises:

obtaining, by said daemon process, a first security context for said first process from said operating system based on said first process identifier; and determining, by said daemon process, whether to grant said request for said operation at least partially based on said first security context for said first process.

36. The method of claim 35, wherein said method further comprises:

obtaining, by said daemon process, one or more access policies, rules and/or conditions from said operating system; and determining, by said daemon process, whether to grant said request for said operation at least partially based on said one or more access policies, rules and/or conditions.

37. The method of claim 36, wherein said operating system is and/or includes a SELinux Operating system operable to store and enforce said one or more security policies, rules and/or conditions as a Mandatory Access Control (MAC) mechanism, thereby leveraging the Mandatory Access Control (MAC) mechanism of said SELinux Operating system.

38. The method of claim 34, wherein said request for said operation request is and/or includes a write operation on a configuration file.

39. The method of claim 34, wherein said daemon process is a "GConf" process.

40. The method of claim 39, wherein said request is a write operation, a configuration file associated with said "GConf" process.

* * * * *